Feb. 26, 1963  F. CORDERO ETAL  3,078,719
AIRPLANE CABIN PRESSURE ERROR OR DEVIATION INDICATOR
Filed Feb. 8, 1960  2 Sheets-Sheet 1

Inventors
FIDEL CORDERO
RICHARD W. ARMSTRONG

By R. J. Tompkins
Attorney

Inventors
FIDEL CORDERO
RICHARD W. ARMSTRONG

3,078,719
Patented Feb. 26, 1963

3,078,719
AIRPLANE CABIN PRESSURE ERROR OR DEVIATION INDICATOR
Fidel Cordero, Washington, D.C., and Richard W. Armstrong, Rockville, Md., assignors to the United States of America as represented by the Secretary of the Navy
Filed Feb. 8, 1960, Ser. No. 7,497
12 Claims. (Cl. 73—407)
(Granted under Title 35, U.S. Code (1952), sec. 266)

The invention described herein may be manufactured and used by or for the Government of the United States of America for governmental purposes without the payment of any royalties thereon or therefor.

The present invention relates to an aircraft cabin pressure error indicator and more particularly to an indicator which will indicate the deviation of pressure within an aircraft cabin from a predetermined schedule of pressures to be maintained within the cabin versus pressure outside the cabin.

It is well known that because of the multiplicity of instruments required for modern aircraft there has been much effort directed toward combining aircraft instruments or improving the manner of their presentation so that the pilots' task of interpretation would be simplified. The present invention is directed toward simplifying the pilots' task in determining whether the proper pressure is being maintained within an aircraft cabin. The cabins of high altitude aircraft are pressurized beginning at a predetermined altitude up to the ceiling of the aircraft. Depending upon the structural strength of the aircraft cabin and the mission that the aircraft is to perform, a predetermined schedule of cabin pressures versus pressure outside the cabin can be determined. FIGURE 3 illustrates an example of a predetermined schedule of cabin pressures for an aircraft which commences cabin pressure at 8000 feet altitude, which has a structural limiting differential pressure of 5 pounds per square inch and which has a ceiling of 80,000 feet. Heretofore, in order to maintain such a cabin pressure schedule the pilot was required to read the altitude indicator and the cabin pressure indicator and then relate this data to a curve or table. Attention of the pilot for performing these indicator readings and for applying the data to a curve or table is practically impossible when arduous maneuvers are being performed and when the pilot is flying under emergency situations. The present invention has solved this problem by providing a single instrument which will inform the pilot by the position of a pointer in relationship to a mark whether the cabin pressure is above, below or exactly on schedule.

An object of the present invention is to provide an indicator for indicating the deviation in presure within an enclosure from a predetermined schedule of pressures to be maintained within said enclosure.

Another object is to provide an aircraft cabin pressure indicator for indicating the deviation of aircraft cabin pressure from a predetermined schedule of pressures to be maintained within the cabin versus pressure outside the cabin.

A further object is to provide an aircraft cabin pressure indicator for indicating without any instrument error the deviation of aircraft cabin pressure from a predetermined schedule of pressures to be maintained within the cabin versus pressure outside the cabin.

Other objects and many of the attendant advantages of this invention will be readily appreciated as the same becomes better understood by reference to the following detailed description when considered in connection with the accompanying drawings wherein.

Figure 1:
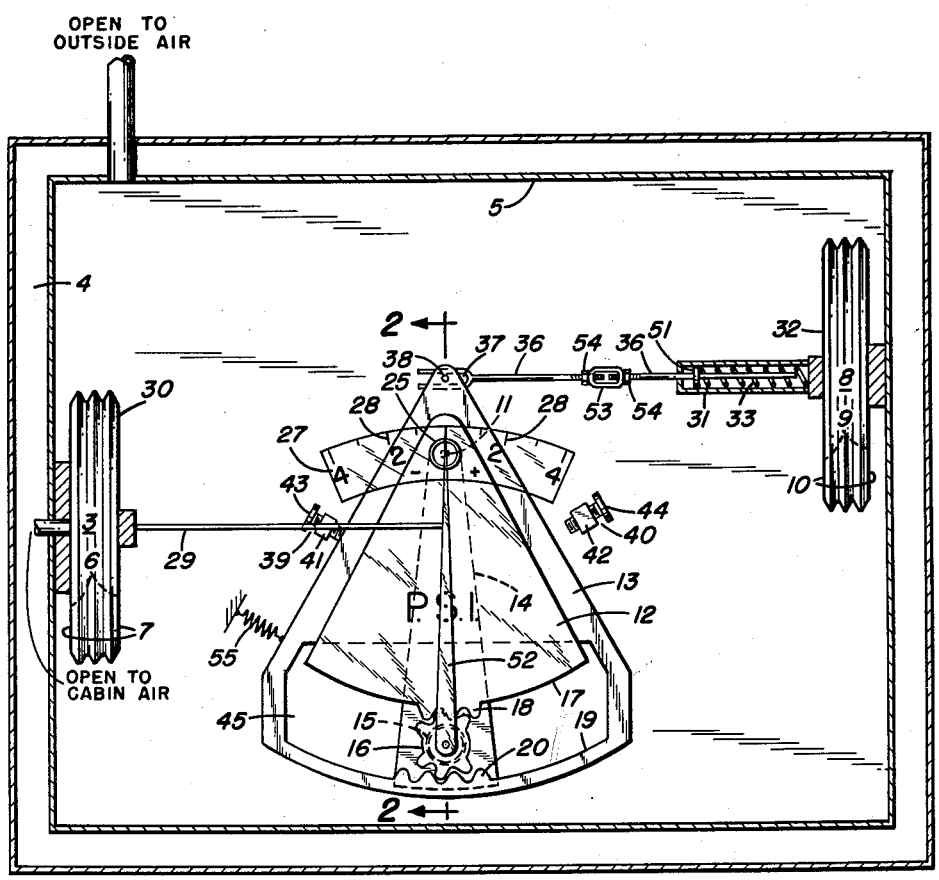
FIG. 1 shows a diagrammatic view of an illustrated embodiment of the invention.
Figure 2:
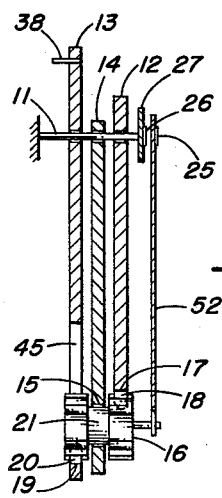
FIG. 2 shows a section of the illustrated embodiment taken on the line 2—2 of FIG. 1.
Figure 3:
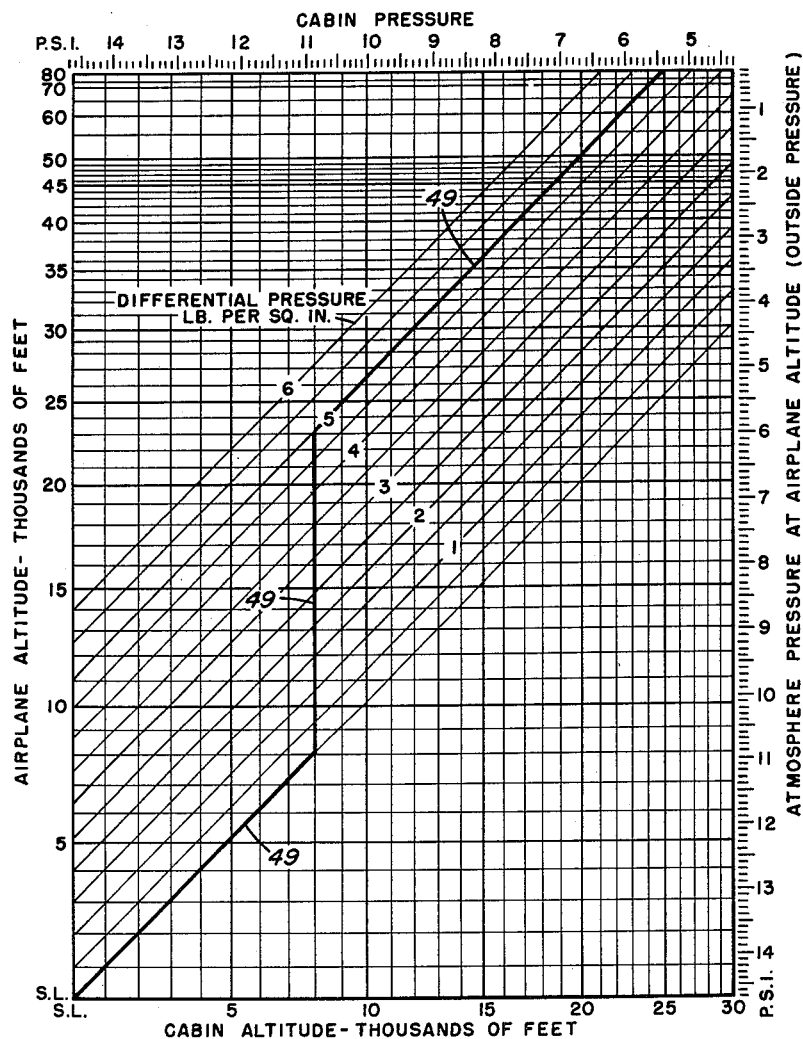
FIG. 3 is an example of a predetermined schedule of pressures to be maintained within an aircraft cabin, the slant lines representing the differential in pressure between pressure in the cabin and pressure outside the cabin in pounds per square inch.

Referring now to the drawings the darkest line 24 shown in FIGURE 3 represents a schedule of pressures to be maintained within an aircraft cabin. This particular schedule is for a cabin that is to be pressurized at 8,000 feet altitude, which has a structural limiting pressure differential between the pressure inside the cabin and outside the cabin of 5 pounds per square inch and which has an altitude ceiling of 80,000 feet. Under such conditions it will be noted that from sea level to 8,000 feet the pressure outside the cabin and pressure inside the cabin are the same, that from 8,000 feet to 23,000 feet a constant absolute pressure is maintained within the cabin and that from 23,000 feet up to 80,000 the absolute pressure of the cabin is decreased in order to maintain a 5 pound differential between cabin pressure and outside pressure. The device illustrated in FIGURE 1 is adapted to operate according to the schedule of pressures set forth in FIGURE 3. In this device a diaphragm capsule 3 and a diaphragm capsule 8 are both fixed within the interior of an instrument case 5, the interior of the instrument case being exposed to the atmospheric pressure outside of aircraft cabin 4. Capsule 3 has an interior side 6 exposed to the pressure within cabin 4 and an exterior side 7 exposed to the pressure outside the cabin 4. Capsule 8 has an interior side 9 exposed to a constant pressure and an exterior side 10 exposed to the pressure outside the cabin 4. Rotatably mounted on a shaft 11 are a first member 12, a second member 13, and a third member 14. Member 14 is journaled at 15 to receive a shaft portion 21 of a pinion gear 16. Member 12 has an arcuate end 17 with teeth 18 thereon to engage the teeth on one side of pinion gear 16 and member 13 has a cutout 45 forming an arcuate face 19 with teeth 20 thereon to engage the other side of the pinion gear 16. Both arcuate end 17 and arcuate face 19 are shaped to an arc of a circle around pin 11. A pointer 52 fixedly attached to the pinion gear 16 at the pinion gears longitudinal axis has a circular end 25 which overlies an equal sized circular reference mark 26 on scale 27, the scale 27 being fixedly attached to shaft 11. Scale 27 has graduated marks 28 laid off as radials from the longitudinal axis of pinion gear 16, one through the center of reference mark 26 and a plurality on each side of said latter mark representing plus or minus pounds per square inch. A rod 29, fixedly attached to a movable portion 30 of capsule 3, is pivotally attached to the first member 12 a predetermined distance from the longitudinal axis of shaft 11. A sleeve 31, fixedly attached to a movable portion 32 of capsule 8, is adapted to contain therein an overtravel spring 33. A rod 36 has a collar 51 adapted to engage the left end of spring 33, this collar being located so that adequate space is left between the right end of rod 36 and end 32 of capsule 8 for overtravel of rod 36 at pressures above a 23,000 foot elevation. The other end of rod 36 has a forked shaped slot 37 adapted to engage a pin 38, said pin being located a distance from the longitudinal axis of shaft 11 which is equal to the distance from said axis to the point of attachment of rod 29 and the member 12. Between sleeve 31 and slot 37 rod 36 is divided and threaded to engage a turnbuckle 53 and locknuts 54. According to the predetermined schedule of pressures shown in FIGURE 3 turnbuckle 53 is adjusted so that slot 37 is extended along the longitudinal axis of rod 36 toward capsule 8 a distance which will prevent operable engagement of rod 36 and pin 38 until the pressure outside the cabin is an 8,000 foot altitude pressure. The outside pressure at which operable engagement will occur between rod 36 and pin 38 can of course be varied by adjusting turnbuckle 53. Stop 39, fixed in relationship to the second member 13, will according to the schedule in FIGURE 3 prevent any rotation of member 13 below the zero elevation pressure. Also a second stop 40, fixed in relationship to the second member 13, will according to the schedule shown in FIGURE 3 prevent the second member 13 from rotating when the outside cabin pressure altitude is 23,000 feet or higher. The stops 39 and 40 are made adjustable by fixedly positioning nuts 41 and 42 in the proximity of second member 13 so that screws 43 and 44 can be screwed therein to vary the stopping position of the member. With such an arrangement by adjusting stop 39 fine adjustments of the zero elevation pressure can be attained and by adjusting stop 40 the schedule as shown in FIGURE 3 can be changed depending upon the structural strength of the cabin. It is to be noted that when the aircraft is ascending above the 23,000 foot level the second member 13 and rod 36 are stationary, the movement of capsule 8 being taken up by the overtravel spring 33. In order to keep member 13 biased against stop 39 when rod 36 is not in engagement with pin 38 a tension spring 55 is fixedly attached at one end to member 13 and at its other end is fixedly attached to case 5.

In the operation of the illustrated embodiment of the invention it will be noted that from sea level to 8,000 feet neither member 12 nor member 13 will rotate around shaft 11 since rod 36 is merely moving the length of slot 37 over pin 38 and there is no pressure differential on capsule 3. Commencing at the 8,000 foot level the cabin must be pressurized in order to maintain the schedule shown in FIGURE 3 and if a constant absolute pressure is maintained within the cabin the capsule 3 will expand at the same rate that capsule 8 expands, thus rotating members 12 and 13 at the same angular velocity around shaft 11. This means that pinion gear 16 will not rotate around its own axis but will translate around shaft 11. Even though such translation occurs it will be noted that since the circular portion 25 of the pointer 52 overlies the longitudinal axis of shaft 11, the circular portion 25 will not be altered in its position over reference mark 26. As long as the absolute pressure at 8,000 feet is maintained within the cabin the circular portion 25 will overlie reference mark 26 until a 23,000 feet altitude is reached. At this level member 13 is prevented from further rotation by stop 40 and unless the pressure within the cabin is bled off member 12 will rotate relative to member 13 causing pinion gear 16 to rotate the pointer 52 away from reference mark 26. However, if the cabin pressure is bled properly above 23,000 feet the pointer will directly overlie the reference mark 26 until the ceiling of the aircraft of 80,000 feet is attained.

Obviously many modifications and variations of the present invention are possible in the light of the above teachings. It is therefore to be understood, that within the scope of the appended claims, the invention may be practiced otherwise than as specifically described.

What is claimed is:

1. An indicator for indicating the deviation in pressure within an enclosure from a predetermined schedule of pressures to be maintained within said enclosure comprising a first diaphragm capsule sensitive to the differential in pressure between the scheduled pressure in said enclosure and a variable pressure, a second diaphragm capsule sensitive to the said variable pressure, first, second and third members mounted in parallel planes for rotation around a common axis which is fixed in relationship to said enclosure, a pinion gear rotatably mounted on said first member, said second member having gear teeth circumscribing an arc of a circle around said common axis for engaging the teeth on one side of said pinion gear, said third member having gear teeth circumscribing an arc of a circle around said common axis for engaging the teeth on the other side of said pinion gear, a pointer fixedly attached to said pinion gear, a scale fixedly mounted with respect to the enclosure so that movements of said pointer in relation to the scale will be apparent, said first diaphragm capsule connected to said second member, said second diaphragm capsule operatively connected with said third member, and a first stopping means for stopping said third member in its rotation below a predetermined pressure.

2. An indicator as claimed in claim 1 wherein said second diaphragm is connected to said third member by a rod therebetween, said rod operatively engaging, for rotation, said third member only below a predetermined pressure.

3. An indicator as claimed in claim 2 including a second stopping means for stopping the rotation of said third member above a predetermined pressure.

4. An indicator as claimed in claim 3 wherein said first and second stopping means are adjustable so that said predetermined schedule of pressures to be maintained with said enclosure can be varied.

5. In combination with an aircraft cabin, an aircraft cabin pressure indicator for indicating the deviation of cabin pressure from a predetermined schedule of pressures to be maintained with the cabin versus pressure outside the cabin, said indicator comprising a first diaphragm capsule fixed in relationship to the cabin and having an interior side and an exterior side, the interior side of said first capsule being exposed to the pressure inside said cabin and the exterior side of the first capsule being exposed to the pressure outside said cabin, a completely sealed second diaphragm capsule fixed in relationship to the cabin having an interior side and an exterior side, the exterior side of the second capsule being exposed to said pressure outside the cabin, first, second and third members mounted for rotation in parallel planes around a common axis, said axis being fixed in relation to said cabin, a pinion gear rotatably mounted on said first member, said second member having gear teeth circumscribing an arc of a circle around said common axis for engaging the teeth on one side of said pinion gear, said third member having gear teeth circumscribing an arc of a circle around said common axis for engaging the teeth on the other side of said pinion gear, a pointer fixedly attached to said pinion gear, a scale fixed in relation to said cabin having a fixed reference point for indication by said pointer of a pressure deviation, a first connecting means for connecting the movable portion of said first capsule with said second member, a second connecting means for connecting the movable portion of said second capsule with said third member and a stopping means for stopping the movement of said third member in its movement around said common axis for a predetermined range of outside pressures.

6. An aircraft cabin pressure indicator as claimed in claim 5 wherein said first and second connecting means are operably connected to said second and third members respectively at equal moment arms from said common axis and are operably connected to said second and third members respectively in opposite directions from said common axis.

7. An aircraft cabin pressure indicator as claimed in claim 6 wherein said second connecting means is a rod having first and second ends, said first end engaged with said third member and said second end being operably connected to the movable portion of said second capsule, an overtravel spring in juxtaposed relationship to said second end so that said second capsule can move when said third member is prevented from movement by said stopping means, said third member having a perpendicular projection at the point of connection between said first end and said third member, said first end having a slot which operably engages said projection, said slot being a predetermined distance along the longitudinal axis of said second connecting means.

8. An aircraft cabin pressure indicator as claimed in claim 7 wherein said stopping means comprises a first stop and a second stop, said first stop being fixed in relationship to said cabin for stopping the motion of said third member at a predetermined outside pressure and all lesser pressures and said second stop fixed in relationship to said cabin for stopping the motion of said third member at a predetermined outside pressure and all greater pressures.

9. An aircraft cabin pressure indicator as claimed in claim 8 wherein said stopping means are adjustable.

10. An aircraft cabin pressure indicator as claimed in claim 8 wherein said fixed reference mark overlies said common axis.

11. An aircraft cabin pressure indicator as claimed in claim 10 wherein said reference mark and the pointing end of said pointer are both circular in shape and of substantially the same size and are positioned relative to each other so that the pointer will substantially obscure the pilot's vision of the reference mark when the pressure within said cabin is on schedule.

12. An aircraft cabin pressure indicator as claimed in claim 11 wherein said scale is arcuate and underlies said pointer, said arcuate scale having radial marks thereon, said radial marks extending from a single point, said single point being located at the connection point of said pointer and said pinion gear when the indicator is at zero elevation, and said radial marks on each side of said reference mark representing pounds per square inch pressure over or below said predetermined schedule of pressures to be maintained within said cabin.

References Cited in the file of this patent
UNITED STATES PATENTS
2,549,673    Del Mar _____ Apr. 17, 1951